United States Patent [19]
Schmitt

[11] Patent Number: 5,634,433
[45] Date of Patent: Jun. 3, 1997

[54] FISH TANK BRIDGE AND METHOD FOR MAKING SAME

[76] Inventor: Mark A. Schmitt, 3909 DeVeaux St., Niagara Falls, N.Y. 14305

[21] Appl. No.: 405,710

[22] Filed: Mar. 17, 1995

[51] Int. Cl.$^6$ ...................................................... A01K 63/00
[52] U.S. Cl. ............................................................ 119/250
[58] Field of Search ..................................... 119/248–250

[56] References Cited

U.S. PATENT DOCUMENTS

| | | | |
|---|---|---|---|
| 2,646,021 | 7/1953 | Rice | 119/249 |
| 3,991,715 | 11/1976 | Gibson, Jr. | 119/249 |
| 5,230,298 | 7/1993 | Pearce | 119/250 |

FOREIGN PATENT DOCUMENTS

3436170  4/1986  Germany ................ 119/250

*Primary Examiner*—Gene Mancene
*Assistant Examiner*—Thomas Price
*Attorney, Agent, or Firm*—Wallace F. Neyerlin

[57] ABSTRACT

The combination of two aquarium fish tanks bridged by a plastic bridge tube is disclosed. The bridge tube is shaped to accommodate the insertion of the ends of said bridge tubes in each of the fish tanks. A pump and filter are connected to a narrow diameter tube to force water and air in one of the tanks to flow to the other tank and then back to the first tank through the plastic bridge tube to equalize the water level in both fish tanks, and to enhance the flow of fish through the plastic bridge tube. The combination of tanks may have two plastic brackets supporting the bridge tube. One of each of the brackets is coupled to the top of each fish tank. The plastic brackets are shaped with a vertical planar surface and horizontal planar surface, each surface having a substantially semi-circular cut out in the planar surface of substantially the same diameter as the diameter of the fish tank bridge tube to provide stable support of the bridge tube both above and within the aquarium fish tanks being bridged.

24 Claims, 12 Drawing Sheets

FISH TANK BRIDGE AND METHOD FOR MAKING SAME

BACKGROUND OF THE INVENTION

The invention relates to novel and inexpensive means and apparatus for enabling aquarium fish to swim or be transported back and forth between customary type aquariums presently sold commercially. The invention also relates to inexpensive and relatively simple processing steps for accomplishing the foregoing objectives.

DESCRIPTION OF THE PRIOR ART

The following patents were found during a prior art search but none of these references are considered to be anticipatory of the features and advantages of the Fish Tank Bridge and connections therefor of the present invention.

U.S. Pat. No. 192,595, issued Jul. 3, 1877: This reference teaches means for connecting one fish tank to another and for the fish to go from one tank to another. However, the materials employed are awkward and come as an entire non-retrofittable unit. The process of filling the means for bridging the tanks to each other is a tedious one and includes the requirement of using an air pump to reduce atmospheric pressure, as compared to the means employed in the present invention.

U.S. Pat. No. 1,576,462, issued Mar. 9, 1926: FIG. 2 of this patent shows a serpentine duct bridging two tanks and FIGS. 6 and 7 illustrate other bridging variations. The bridging employed are believed to be of fragile glass and require an elaborately difficult support means which would be difficult to adapt or retrofit to standard aquarium set ups on the market.

U.S. Pat. No. 1,943,417, issued Jan. 16, 1934: This invention relates to a self filling waterway arch for fish and is for use only in a single tank and would be difficult to adapt to usual aquarium apparatus.

U.S. Pat. No. 2,059,927, issued Nov. 3, 1936: The water passover or swimway of this patent is believed to have been formed from glass as compared to the particular material employed in the present invention (the specific benefits of which are described hereinafter) and the means for supporting the water passover in the tanks illustrated are considered to be inadequate to prevent their easily being tipped over by anyone setting up the aquariums and the passover between same.

U.S. Pat. No. 2,646,021, issued Jul. 21, 1953: This reference teaches a fish bowl and hollow handle assembly for same which comes as a one piece unit and is therefore unsuitable for bridging two fish tanks or aquariums to each other.

U.S. Pat. No. 3,921,583, issued Nov. 25, 1975: This reference teaches a very elaborate modular aquarium system which could be very expensive to build or purchase and fails to teach a simple and inexpensive means for connecting two aquariums for easily enabling tropical or aquarium fish to go from one tank to another.

U.S. Pat. No. 3,991,715, issued Nov. 16,1976: This reference teaches a swimway which is suspended by means of a mount which attaches to rods which bridge the top of an aquarium, or in another embodiment, a floating mount which holds the swimway above the surface of the aquarium. The mount and swimway are bulky and limit the distance and placement of the tanks employed.

SUMMARY OF THE PRESENT INVENTION

The "fish-bridge" of the present invention, through its novel design and processing steps and extremely simple construction technique, specifies and makes possible an entirely unique system that allows an infinite number of aquariums to be connected, and, if desired, filtered and aerated simultaneously. The type of materials and the way they are used lowers the production cost of materials and labor to just a few dollars.

The aquarium bridge itself is made from thin-wall hollow plastic tubing. The tubing is preferably transparent so as to make possible the observation of the aquarium fish as they swim back and forth between the tanks. Several chemically different plastic materials are considered usable plastics for the bridge tubes of the invention. Suitable plastics are generally thermoplastics since they can be softened or remelted. Suitable are polymers of the polycarbonate type and of the acrylic type, such as polymethyl methacrylate, and various polyesters such as polyethylene terephthalate, polybutylene terephthalate and aromatic copolyesters. Also suitable plastics are cellulose acetate butyrate, and polyvinyl chloride. Such thin wall plastic tubing can be easily bent to any angle by filling the tubing with sand or fine aquarium gravel and applying heat such as via a heat gun or a fan tipped torch, followed by bending to the desired shape. The bridge tubes generally have a diameter depending on the size of the fish and sufficient to avoid the fish becoming wedged in the tube, and preferably about one inch to about six inches. The bridge tubes generally have a wall thickness of about 1/16 to about 1/4 inch.

Such tubing is employed as the plastic bridge tube for the fish to go back and forth between two or more aquarium tanks and is connected thereto by plastic brackets such as sheet plexiglass (polymethyl methacrylate). Other plastics can be used such as those plastics suitable for the plastic bridge tubes. The brackets are fashioned from pieces of plastic about 15 to 25 inches long and as wide as required to hold the particular diameter bridge tubing used. The plastic sheets may have a thickness of about 1/8 to about 3/8 inch. The brackets may also be easily heated and formed to shape in a home shop jig using a fan-tipped torch or can be mass produced commercially. The brackets, once heat formed, can then be tapped using 1/4 inch nylon screws to fasten the brackets to the walls of the aquarium being joined. Further, the brackets can be shaped with vertical and horizontal planar surfaces and also in such a shape (as further described hereinafter) that the brackets can be firmly attached to the walls of the aquariums by virtue of the mechanical strength of the plastic used in the bracket, without the need of using the nylon screws.

Two easily available or specially made plastic caps are used for covering each of the ends of the tubing after filling it with water in order to seal water in the tube while positioning and installing the tubing in each of the aquarium tanks to be bridged or joined.

A preferred embodiment of the invention utilizes a pump in one of the tanks to be joined, to which is attached a length of small diameter preferably clear tubing, the other end of which is immersed in the opposite or second aquarium tank. A still more preferred embodiment utilizes a combination of a filter with the pump. The small diameter tubing may vary in diameter from about 0.25 to about 0.5 inch in diameter, but is sufficiently small in diameter to keep the fish out. This hollow tubing is preferably flexible, and can be made of plastic or rubber. Typically the small diameter tubing may be made of commercially available tubing known as Tygon plastic tubing, or rubber tubing.

Preferably, the power head of the pump is located in the tank in which the filter is located and the pump and filter are located in the water. The pump thus induces air and water flow from the tank in which it is located to the opposite or second tank and thus also causes water flow from the opposite tank, through the fish-bridge plastic tubing, back to the tank in which the filter and pump are located. The filter thus cleans the water contained in both tanks.

This combination of filtration and air and water flow is referred to as the "induced flow concept." It was noted from considerable observation that the concept greatly enhances a fish's natural instinct to utilize the tank bridge, as compared to fish tank bridge apparatus operating without such a pump induced flow of air and water. In other words, it was noted upon original testing of the fish tank plastic bridge tube of the present invention that fish appeared to have a neutral, if not adverse reaction, to entering the bridge tube, i.e., that the fish appeared to have a sort of instinct not to swim into or down a "blind tunnel" of sorts. However, when the induced flow concept of this invention was introduced between the tanks the fish placed therein reacted positively and began using the bridge regularly.

Several different types of pumps are employable in carrying out this aspect of the invention and will depend upon such factors as cost, flow-rates desired, the sizes of the aquariums being joined and the diameter of the plastic bridge tube, and the like. The Aqua-Clear Power Head pumps: Model 201 which pumps up to 126 gallons of water per hour; to Model 802 which pumps up to 400 gallons of water per hour are examples. Penguin Pumps: model 550, up to 145 gallons per hour and Model 1140 up to 300 gallons per hour are examples. Also, several pump and filtering system arrangements are possible. The pump and filtering system may both be in the water; or it may be a pump outside the water with undergravel filters within the aquarium.

A variety of filters can be employed in connection with the pump to filter out solid particles such as impurities. Suitable filters include those with filter media made of plastic foam, fiberglass and charcoal. Suitable commercial units include Magna-Flo 350 pump/filter combinations, and Quick Filter or Reverse Flow filters by Penguin Manufacturing which are filter units with a plastic foam medium.

Further teachings and advantages of the present invention will be apparent from the following brief description of the drawings.

BRIEF DESCRIPTION OF THE DRAWINGS

FIG. 22b shows a perspective view of the novel end cap of FIG. 22a

The drawings and specific embodiments of the invention are now described in more detail in order to emphasize and clarify more clearly the novel and advantageous features of the invention.

DETAILED DESCRIPTION OF THE DRAWINGS
and of the Preferred Embodiments

Figure 1:
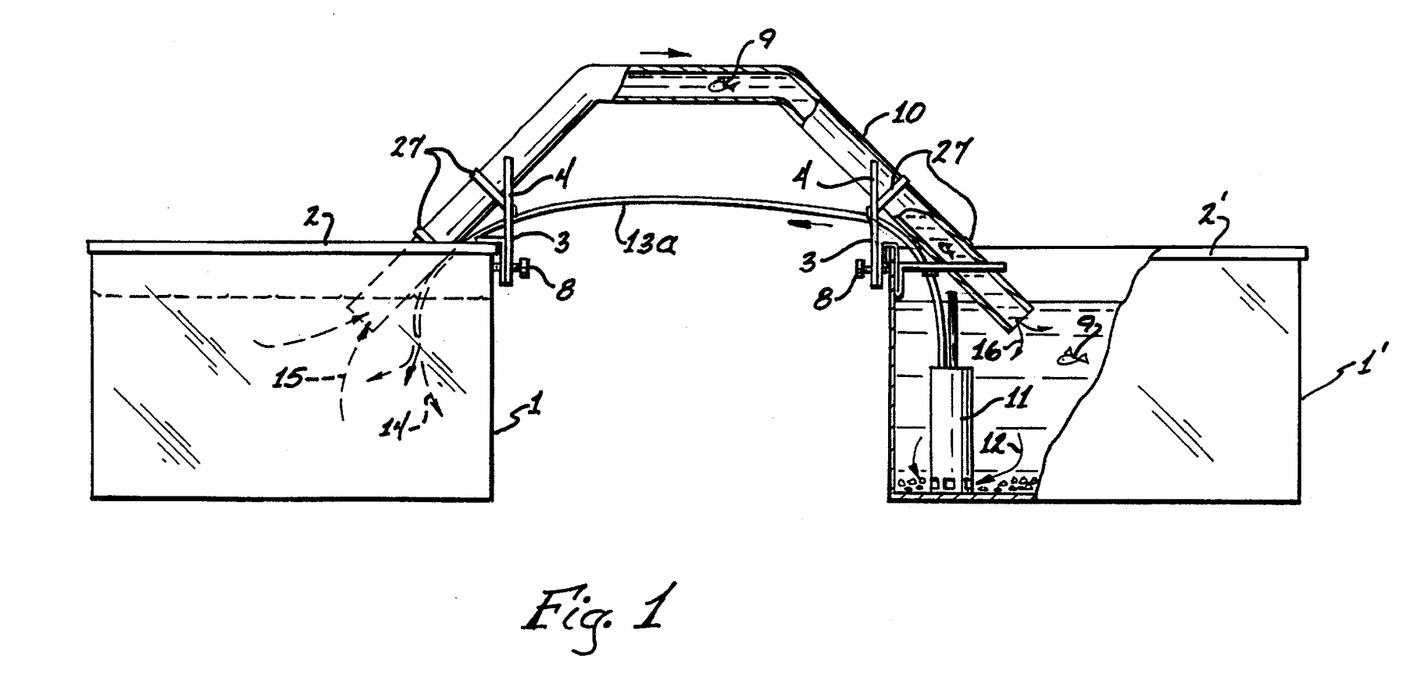
FIG. 1 is a side elevational view of a preferred embodiment of the invention illustrating a plastic bridge tube connecting two aquarium tanks and assembled and positioned in same as described in detail hereinafter.
Figure 2:
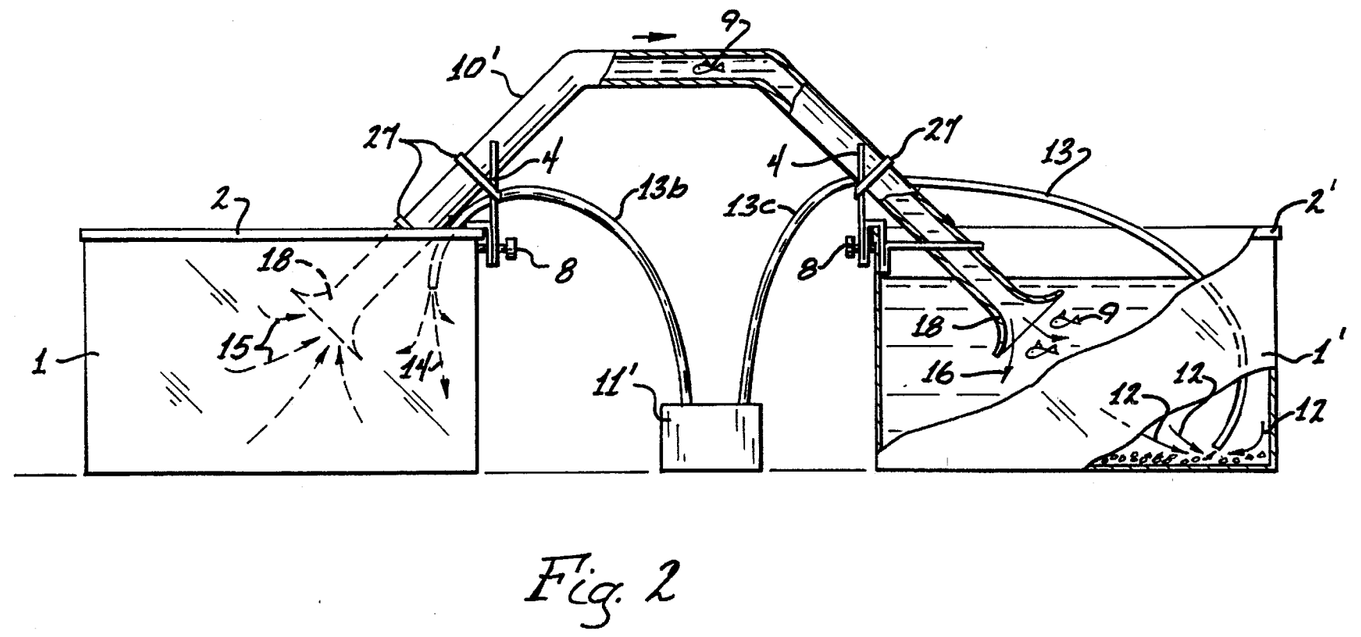
FIG. 2 is a side elevational view of the arrangement of the present invention illustrating some varying arrangements within the scope of the invention.
Figures 3, 4, 5:
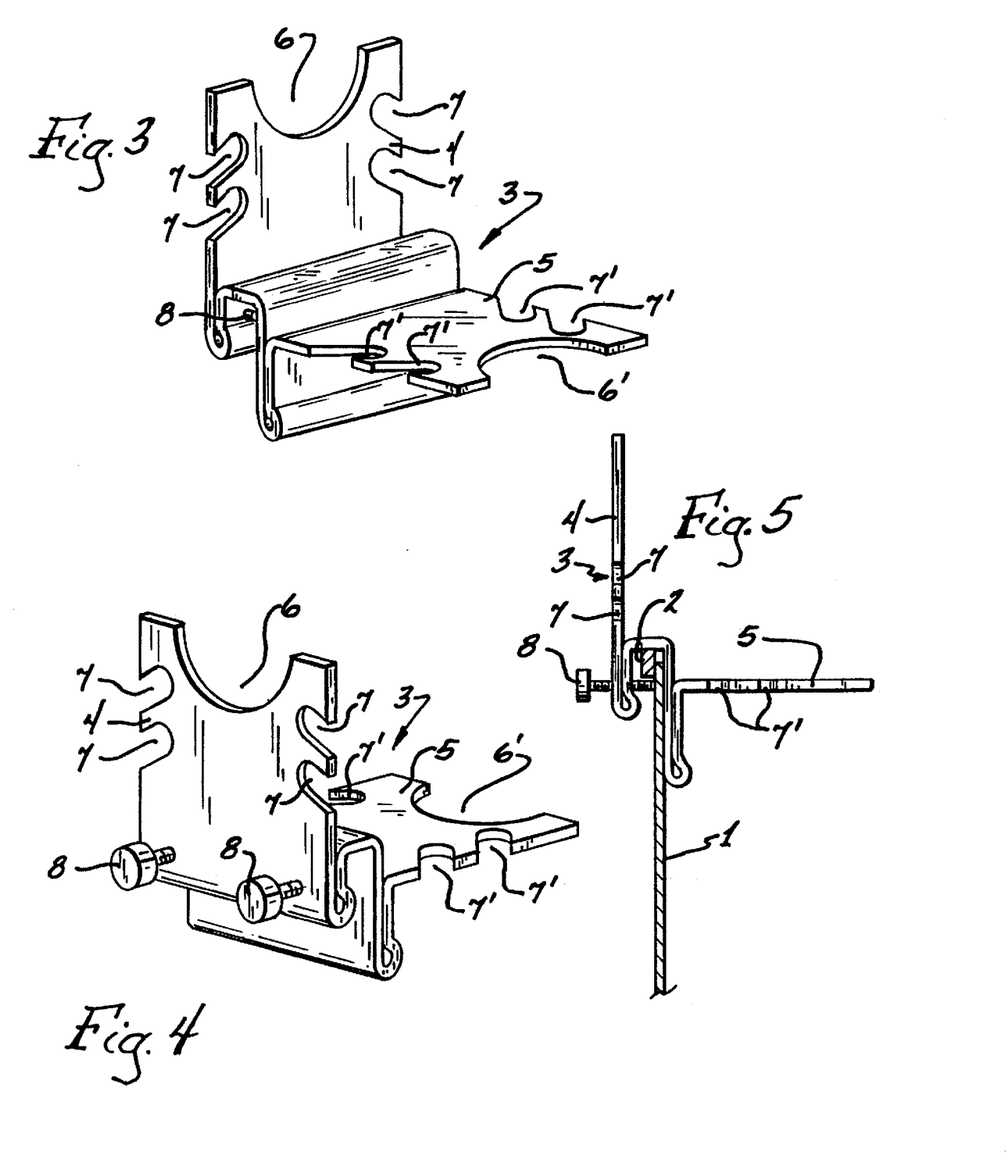
FIG. 3 is a front perspective of a specially designed bracket employed in the invention.
FIG. 4 is a rear perspective view of the bracket.
FIG. 5 is an enlarged side elevational view of the bracket as attached to a side or end wall of one of the aquariums.

In each of the Figures, numeral 1 denotes an aquarium or a wall or side thereof. Numeral 2 denotes a rim along the top of the walls of the aquarium. Numeral 3 denotes a specially designed bracket for use in assisting in connecting the plastic bridge tube between the aquariums and fixing it rigidly in place as illustrated in FIGS. 1 and 2. Numeral 4 denotes a vertical leg of the bracket and numeral 5 a horizontal leg of the bracket. Numeral 6 denotes a semicircular cut-out from the vertical leg of the bracket, and 6' denotes a semi-circular cut-out from the horizontal leg of the bracket. The plastic bridge tubes rest on the cutouts 6 and 6' in the brackets 3 and 3'. Therefore, the depths of the cutouts 6 and 6' define the angle of entry of the plastic bridge tube into the water in the respective fish tanks. The bracket cutouts 6 and 6' are regularly cut so that the plastic bridge tubes are generally set at an angle of about 45 degrees, more generally, in the range of 30 to 60 degrees. But the angle can be adjusted so that the plastic bridge tubes enter the water at various angles as desired. Numeral 7 denotes cut-outs in the side walls of the vertical leg of the bracket and numeral 7' denotes cut-outs in the side walls of the horizontal leg of the bracket. Numeral 8 denotes thumb screws, e.g., ¼" nylon screws for tightening the vertical legs of the brackets to the side or end of the walls of the aquarium, preferably just under the rim 2 as shown in FIG. 5. In making this attachment, holes slightly smaller than ¼" in diameter are typically drilled in the two places as shown in FIG. 4 and nylon thumb screws can then be easily threaded into and through the holes in a tight fitting manner in the holes of the vertical leg until the ends of the screw butt tightly against the wall of the aquarium just under the rim 2 as shown in FIG. 5.

Numeral 10 denotes the fish tank plastic bridge tube and numeral 9 denotes a fish swimming in the tube going from one tank to the other. The fish tank plastic bridge tube and brackets therefor as just described are considered in themselves to comprise a unique and novel combination because they substantially comprise in combination the means for enabling customary type aquariums presently sold commercially to be joined together inexpensively, so as to enable the aquarium fish to swim back and forth between such aquariums.

However, other unique and preferred combinations are considered to exist when a pump is employed in order to effectuate an "induced flow concept" as previously described. In FIG. 1, submersible pump and foam filter 11 is employed whereas in FIG. 2 a pump and foam filter 11' exposed to the air is employed. In each of these figures, a length of small diameter clear tubing 13 is attached to the pumps and connects between the two aquariums. The tubing can be made of plastic or rubber, and is preferably flexible and clear. The small diameter tubing may be made of commercially available tubing known as Tygon plastic tubing.

Numeral 12 denotes direction of flow of water and air into the pump or into the tubing 13. Numeral 14 denotes direction of flow of water and air out of the tubing 13a. Numeral 15 denotes the direction of flow of water through the fish tank plastic bridge tube 10 or 10'. Numeral 16 denotes direction of flow of water out of the fish tank plastic bridge tubes. In FIG. 2, numeral 13c shows small diameter tubing connected to the pump and foam filter 11' that is external to a fish tank. Numeral 13b shows small diameter tubing connected to the pump and foam filter 11' and then to the second fish tank.

Figure 6:
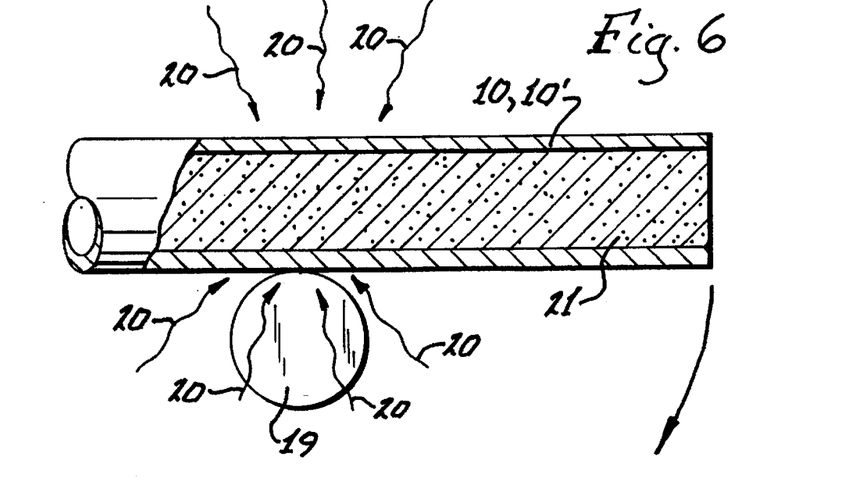
FIG. 6 illustrates a technique that can be employed to create a desired bend in the fish tank plastic bridge tube.
Figure 7:
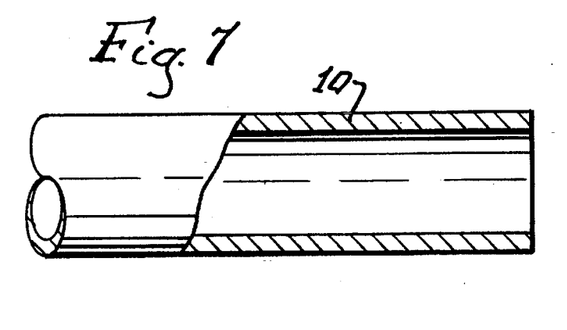
FIG. 7 is a partial cross-sectional view of one end of the fish tank plastic bridge tube of FIG. 1.
Figure 8:
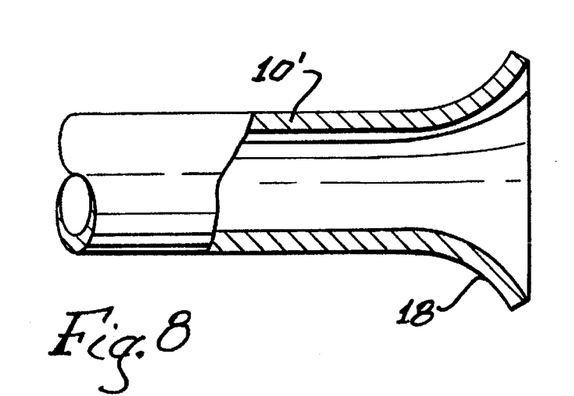
FIG. 8 is a partial cross-sectional view of one end of the fish tank plastic bridge tube of FIG. 2.

Reference is now made to FIG. 6 which illustrates a method for easily bending the fish tank plastic bridge tubing. The tubing 10 or 10' is first loaded with or filled with sand or gravel 21 to prevent the tubing from collapsing upon heating. The ends of the tubing are closed off with end plugs. The tubing is then heated using a suitable heat source 20, such as a heat gun or fan-tipped torch, while holding the tubing over a force-resistant object such as a dowel pin 19 held in place such as in a vise (not shown). Heating is continued until the desired angular bend from normal is achieved (preferably about 45 degrees as shown in FIGS. 1 and 2)

Similar heating and forming procedures can be followed in fashioning the brackets of sheet plexiglass (polymethyl methacrylate) from initial pieces or about 15 to 25 inches long into the shapes illustrated in FIG. 3 and 4 after which the cut-outs 6, 6' and 7 and 7' and the like, can be accomplished by machining operations such as using a heated cut-out die, sawing and/or drilling and or fling, and the like. Other plastics that can be used in making the brackets include the plastics that can be used to make the plastic bridge tubes of the invention.

After the plastic brackets have been formed they are secured to the walls of the aquarium tanks being spanned and connected by the fish tank bridge in the manner previously described and as illustrated in FIG. 5. The tubing is then loaded completely with water and their ends closed off by end caps or plugs such as by end cap 22 or end cap 22a for tube 10 or by end plug 25 for tube 10' as shown in FIGS. 7, 8, 9, 9a and 10. End cap 22 possesses a short width cylinder 23 for ease in positioning into the tubing and a seal portion 24 for water-tightness. End plug 25 possesses a half-sphere portion 26 for easy positioning and water-tightness insertion into the flared end 18 of tubing 10'.

While holding the end plugs tightly against the ends of the plastic bridge tube, the tube is then set in place in the brackets 3 of the water-filled aquariums and held firmly in place in the cut-out portions 6 and 6' therein, such as by wrapping rubber straps 27 around the tubing in the cut-out slots 7 and 7', as shown in FIGS. 1 and 2.

Figure 11:
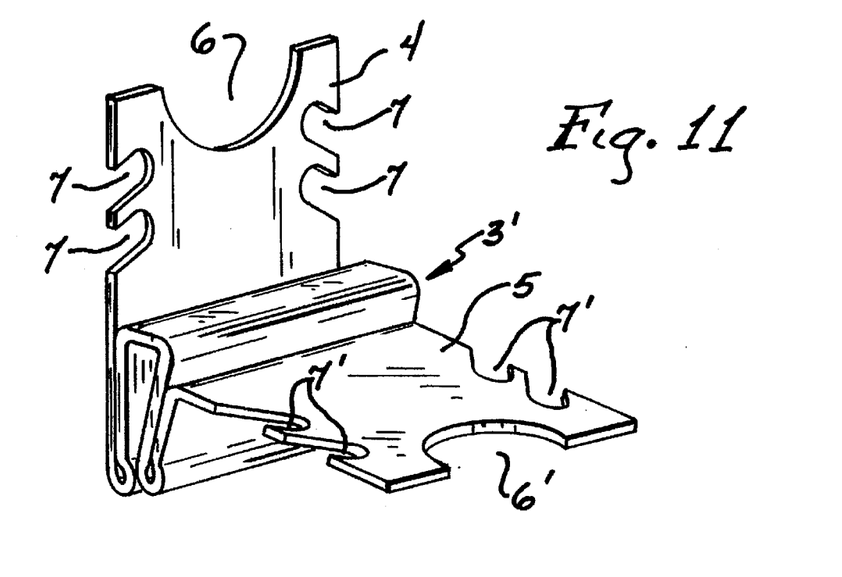
FIG. 11 is a perspective view of an optional bracket requiring no screw holes or screws through the bracket in order to be tightly attached to the end of the aquarium tank.
Figure 12:
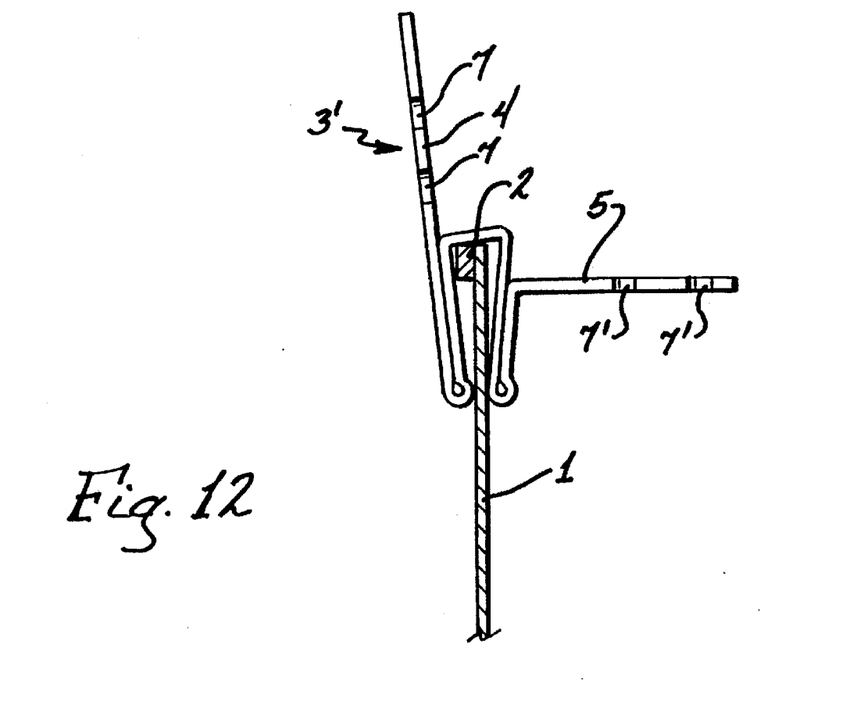
FIG. 12 is a side view of the optional bracket of FIG. 11, illustrating its positioning as attached to the top of one of the aquarium walls.
Figure 13:
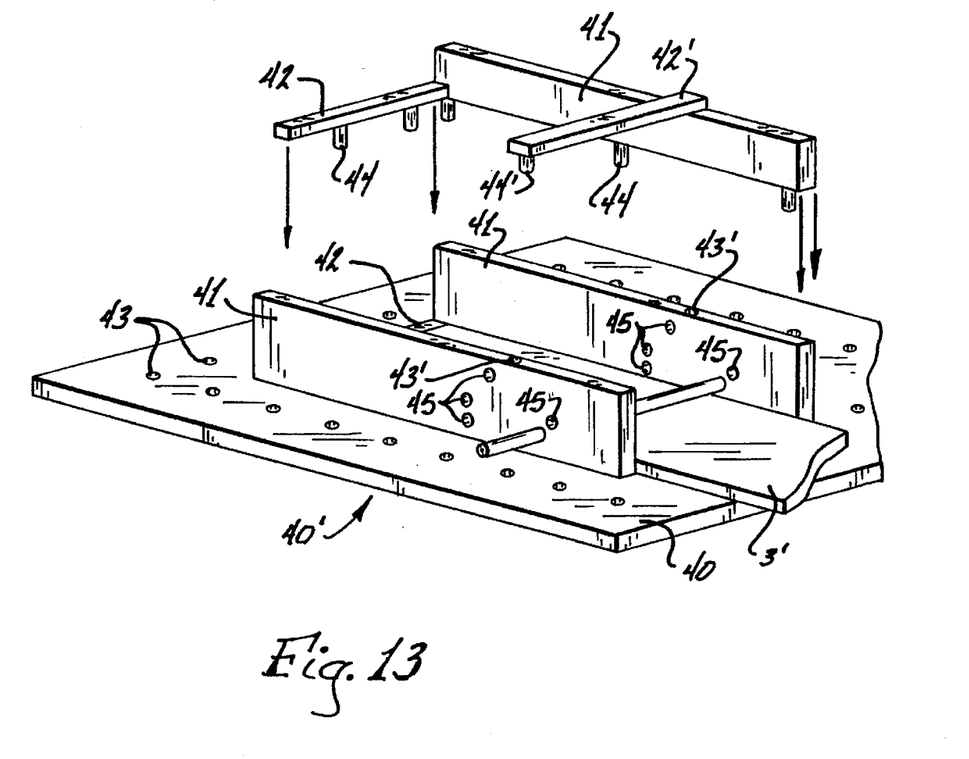
FIG. 13 shows a jig with suitable features for forming the brackets 3 or 3' of the invention.

An optional plastic bracket or clamp 3' for supporting the plastic bridge tube 10 or 10' is shown in FIGS. 11 and 12.

The bracket 3' is comprised of vertical leg or portion 4 and horizontal leg or portion 5 constructed from a single folded plastic sheet which provides a snap fit of the bracket 3' over the aquarium wall 1 and rim 2. The snap fit obviates the need for thumb screw 8 to provide a tight fit of the clamp 3' over the aquarium wall 1. Bracket or clamp 3' is also provided with cutouts 6 and 6' which serve as a cradle for upright positioning of the plastic bridge tube 10 or 10', and cutouts 7 and 7' which provide a place for attachments of the rubber band or strap 27 as shown in FIGS. 1 and 2.

The alternative brackets or clamps 3' are produced as described hereinbefore with respect to brackets or clamps 3 as shown in FIGS. 3, 4, and 5.

The brackets 3 and 3' are produced from sheets of plastic as shown in FIGS. 13 through 17. Jig 40' is comprised of base plate 40, side panels 41 and 41', end panel 42, stop 42' and forming rods 46A through 56E. These plates and panels are provided with holes 43, 43' and 45. Also provided are pins 44 and 44' which act as guides for assembly of the jig 40'.

Figure 14:
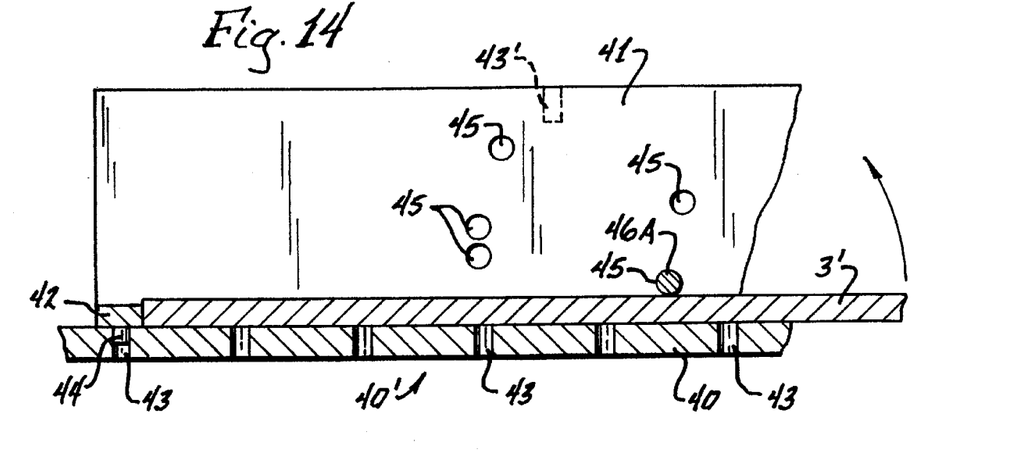
FIG. 14 shows a cross-section of a sheet of plastic being worked to form the bracket of the invention.
Figure 15:
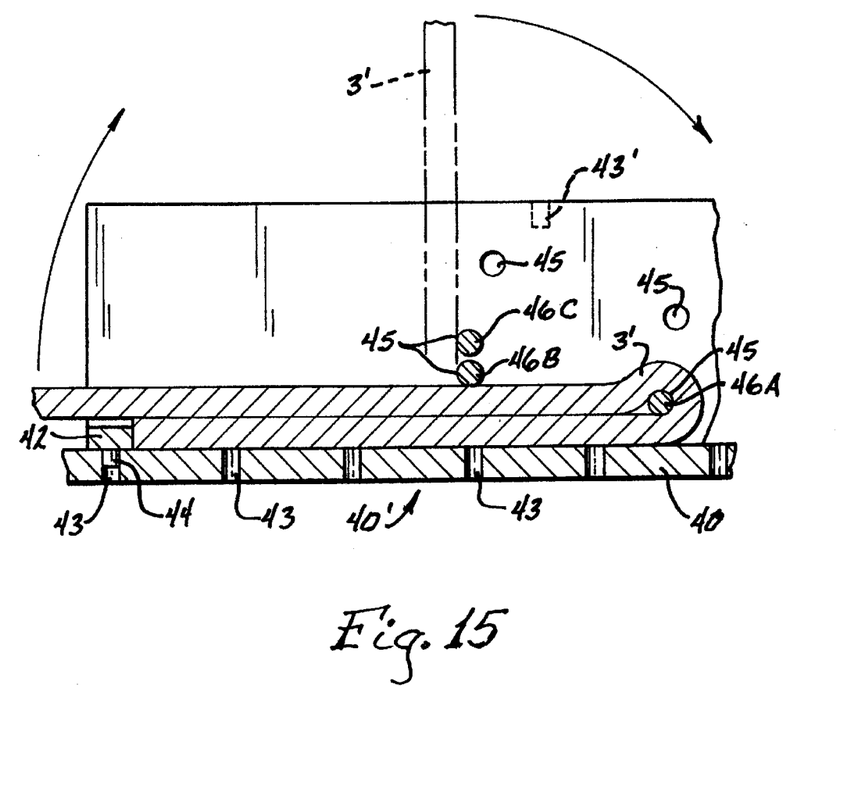
FIG. 15 shows a cross-section view of the worked plastic sheet of FIG. 14 being further worked to form the bracket of the invention.
Figure 16:
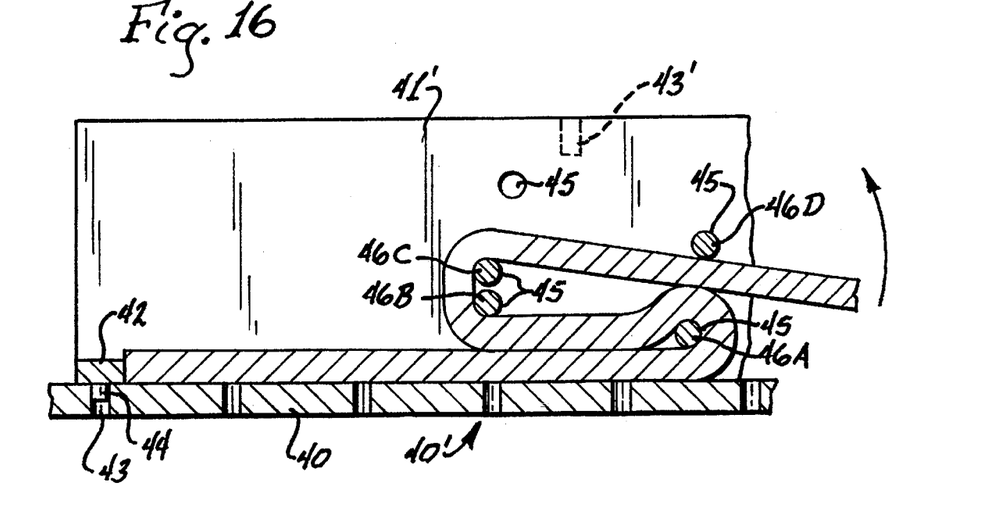
FIG. 16 shows a cross sectional view of the partially worked plastic sheet of FIG. 15 being further worked to form the bracket of the invention.
Figure 17:
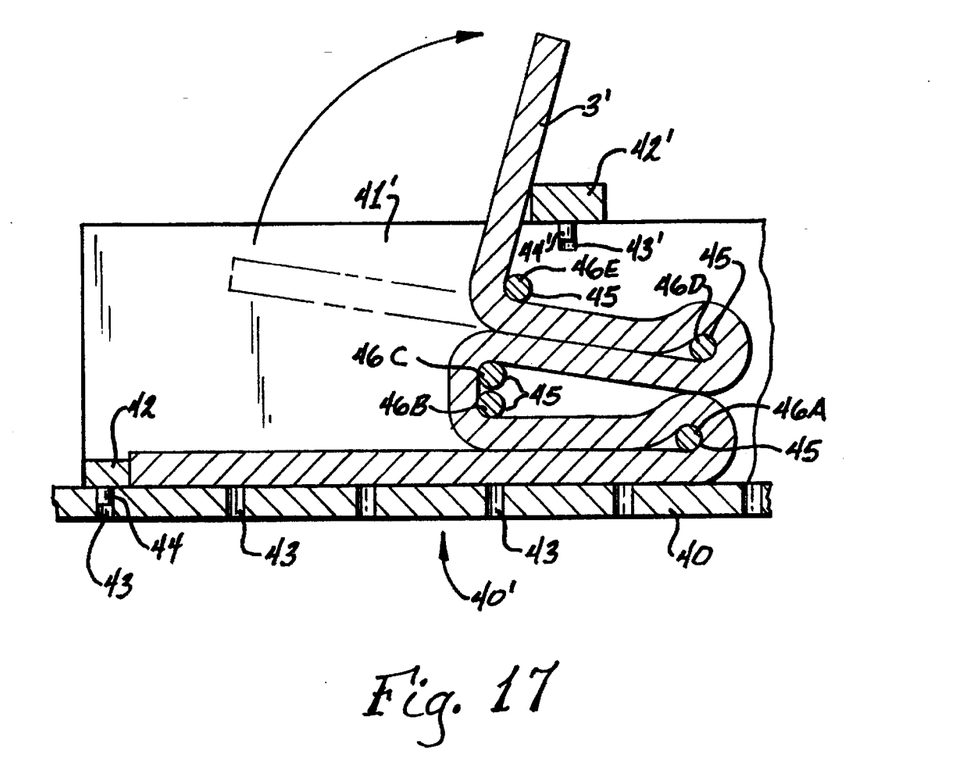
FIG. 17 shows a cross sectional view of the partially worked plastic sheet of FIG. 16 being further worked to form the bracket of the invention.

The plastic sheet for forming the desired bracket 3 or 3' is cut to the desired width of the bracket and is then laid down on the base plate 40. Strips of plastic 3' are heated to a flexible condition, then placed between the side boards 41 and 41' of the jig 40' with one end butted up against end panel 42. While the plastic sheet lays flat, the first rod 46A is inserted in hole 45 as shown in FIG. 14. The plastic sheet 3' is then folded over rod 46A, and the two rods 46B and 46C are inserted in holes 45 as shown in FIG. 15. The plastic sheet 3' is then folded over again. The rod 46D is inserted in hole 45 in the jig 40' as shown in FIG. 16. The plastic sheet is folded over again. The rod 46E is then inserted in hole 45 in jig 40' as shown in FIG. 17. A stop 42' is put in place to bring the plastic to its proper geometry. The bracket 3' is then allowed to cool to its rigid form.

Figure 18:
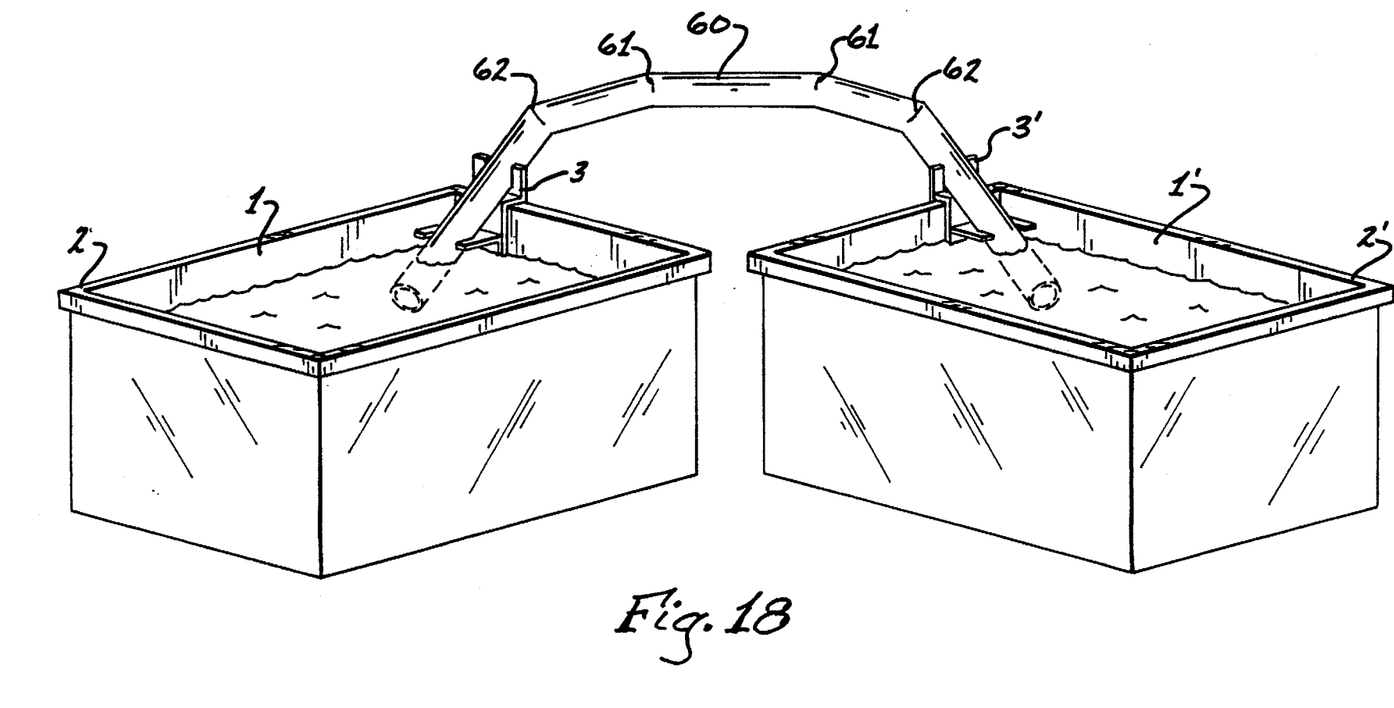
FIG. 18 is a perspective view of two aquarium tanks situated at a 90-degree angle and joined by a plastic bridge tube with multiple bends in the plastic tube which forms the bridge.

Another embodiment of the invention is shown in FIG. 18. Aquarium tanks 1 and 1' are situated at a 90 degree angle with respect to each other. The tanks 1 and 1' are bridged by a plastic bridge tube 60 having multiple bends 61 and 62. Bend 61 is in the horizontal plane relative to the tanks 1 and 1'. Bend 62 is in the vertical plane relative to the tanks 1 and 1'. The plastic bridge tube 60 is held in place and attached to the tanks 1 and 1' at tank rims 2 and 2' by two brackets 3 and 3'. All other features of the bridged tanks 1 and 1' are the same as shown in FIGS. 1 and 2.

Figure 19:
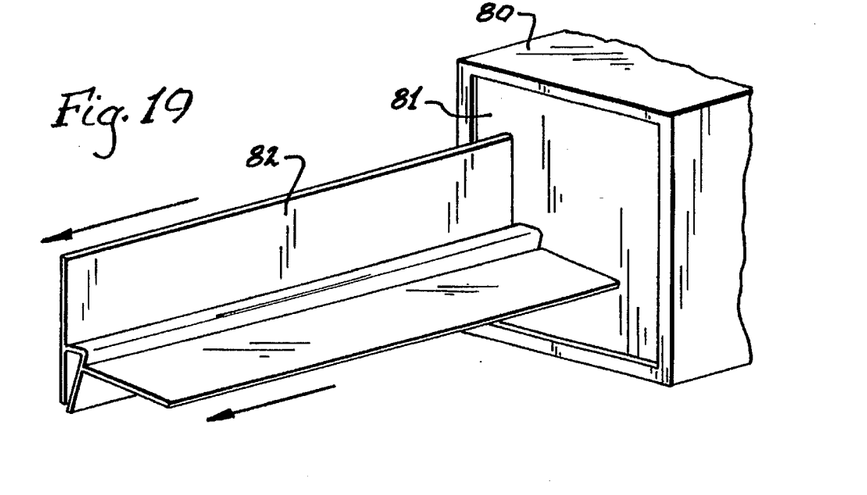
FIG. 19 is a perspective view showing the extrusion of a plastic form that can be used to form the plastic bracket of the invention.
Figure 20:
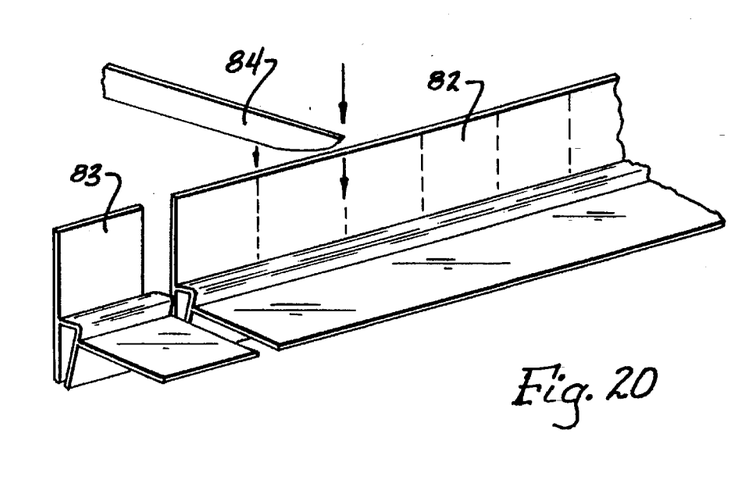
FIG. 20 is a perspective view showing the extruded plastic form of FIG. 19 being cut into suitable segments using a hot knife or other cutting device for forming the plastic bracket of the invention.
Figure 21:
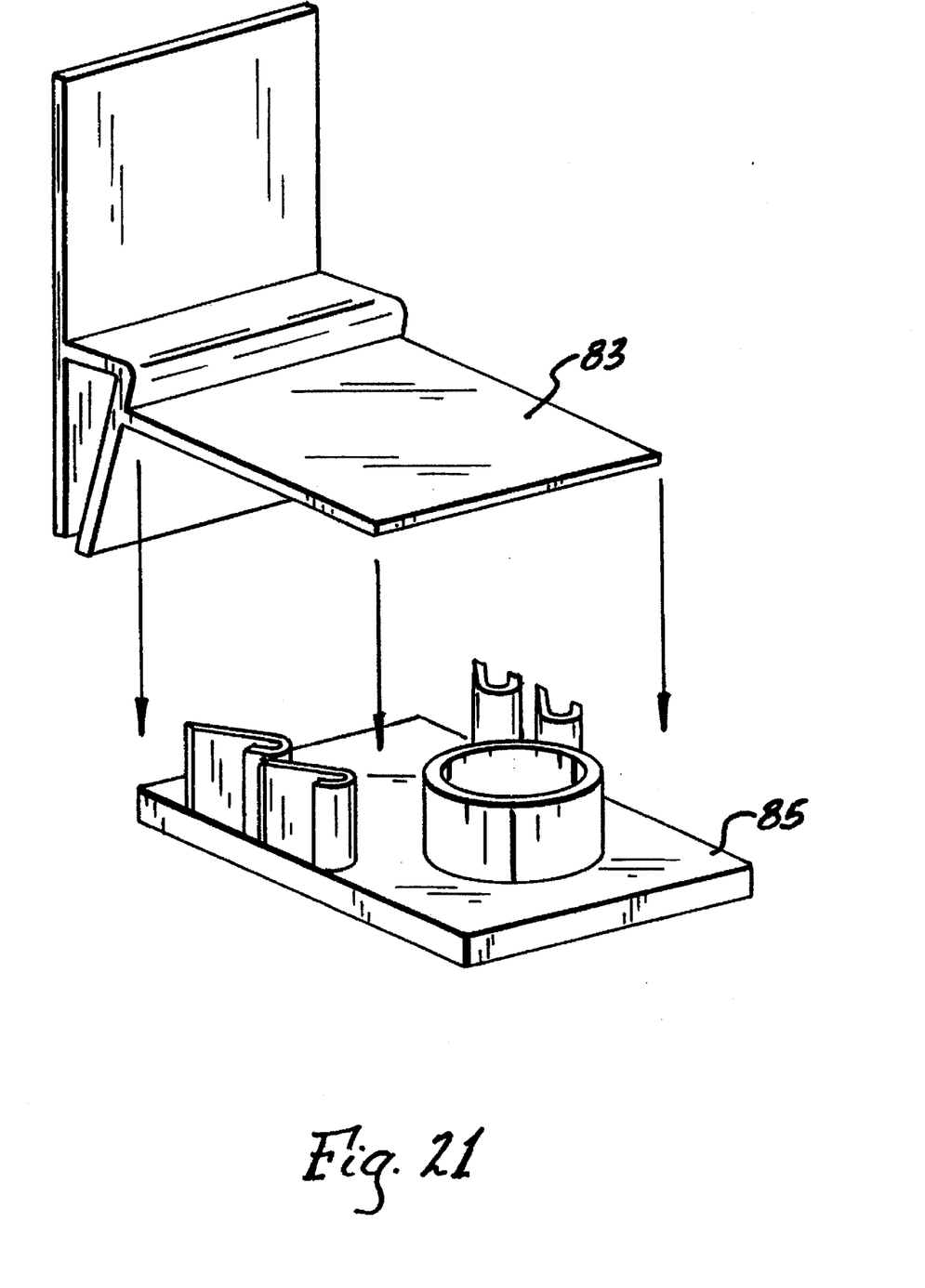
FIG. 21 shows a perspective view of a hot knife cutout tool being used to stamp out the final bracket configuration. The same tool is then used to form the other face.

The mass production of brackets 3 or 3' is shown in FIGS. 19, 20, and 21. In FIG. 19 is shown a plastic extruder 80 equipped with an extrusion die 81 which is designed in the shape or cross-section of the desired bracket 3 or 3'. The plastic raw material desired for the manufacture of the bracket 3 or 3' is melted in the extruder 80 and forced through the die 81 shaped like the cross section of the desired bracket, such as shown by, but not limited to, brackets 3 or 3'.

The extruded plastic 82 is collected as it comes from the extruder die 81 and can be cut into discrete bracket units 83 by knife blade 84 or other suitable cutting device. Subsequently the extruded and cut bracket units 83 are fastened in place so that heated cutting die 85 can be used on the surface of the plastic unit 83 to cut out holes 6 and 6' and 7 and 7', thereby forming the desired bracket such as bracket 3 or 3'.

Figures 9, 9A:
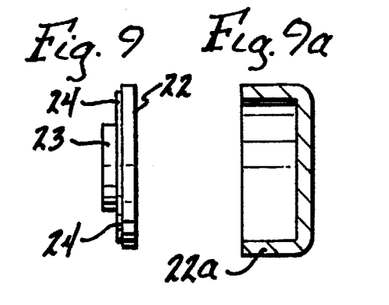
FIG. 9 is a side view of an end cap for closing off one of the tube of FIG. 7 in a watertight manner.
FIG. 9a is a side view of another end cap for closing off one end of the tube of FIG. 7 in a watertight manner.
Figure 10:
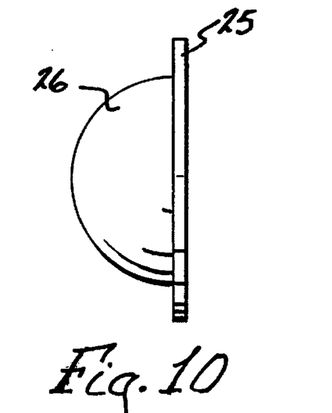
FIG. 10 is a side view of an end cap for closing off one end of the tube of FIG. 8 in a water tight manner.
Figure 22A:
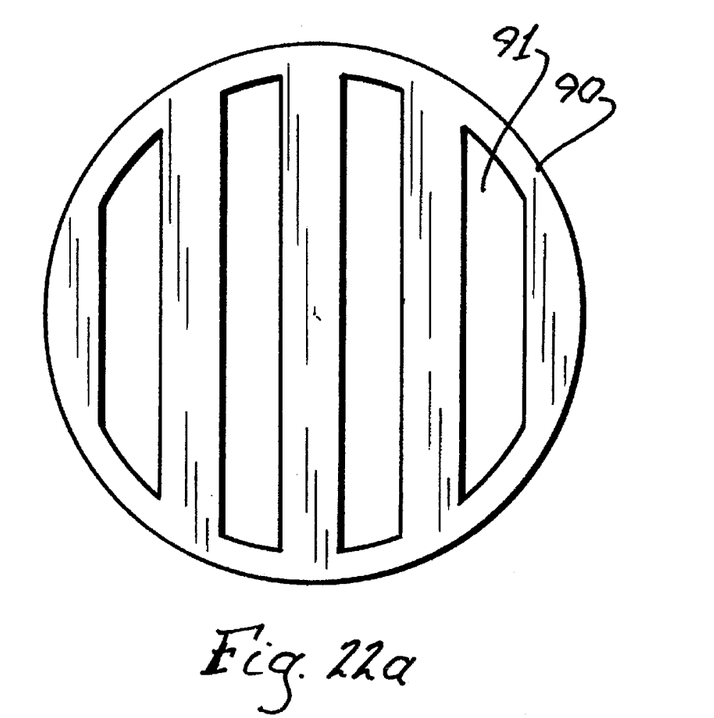
FIG. 22a shows the end view of a novel end cap of the invention.
Figure 22B:
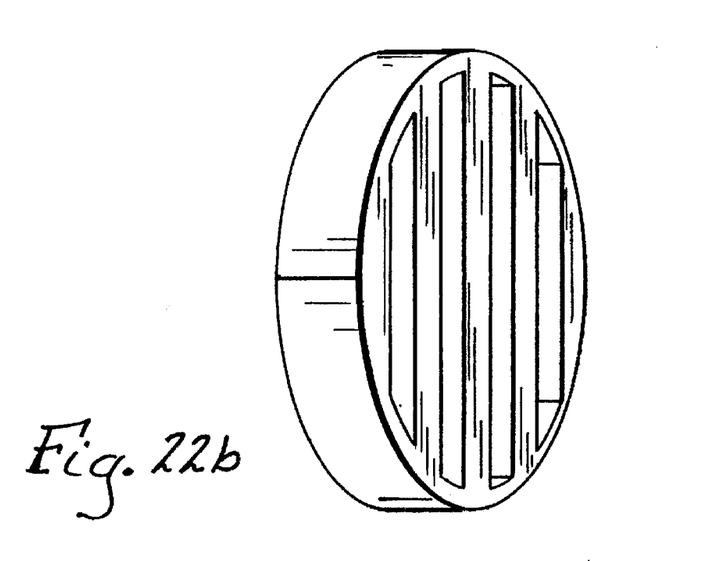

FIGS. 22a and 22b show an end cap 90 as in FIG. 9a, but with slots 91 cut to allow entrance in the plastic bridge of fish that are limited in size to the width of the slots 91. End cap 90 can also be used in conjunction with a bridge tube in a hatchery for movement of fish from one tank to another. The size of the slots 91 can govern the size of fish being separated between two or more tanks.

I claim:

1. The combination of two aquarium fish tanks bridged by a plastic bridge tube, said bridge tube being shaped to accommodate the insertion of the ends of said bridge tube in each of the fish tanks, and two plastic brackets supporting said bridge tube, one of each of the brackets coupled to the top of each fish tank, said plastic brackets being shaped with a vertical planar surface and a horizontal planar surface, each surface having a substantially semi-circular cut out in said planar surface of substantially the same diameter as the diameter of the fish tank plastic bridge tube to provide stable support of said bridge tube both above and within the aquarium fish tanks being bridged.

2. The combination of claim 1 wherein said bridge tube has at least two angular bends.

3. The combination of claim 2 wherein said bridge tube has two angular bends.

4. The combination of claim 3 wherein the angular bends in said bridge tube are each about 45 degrees.

5. The combination of claim 2 wherein said bridge tube has four angular bends.

6. The combination of claims 2 wherein the plastic brackets are each of serpentine shape with two vertical portions and a horizontal portion, one of the vertical portions being situated outside the fish tank and the other vertical portion being situated inside the fish tank and the horizontal portion straddling the top of one of the walls of the fish tank.

7. The combination of claim 6 wherein the vertical portion of the plastic bracket outside the fish tank extends below the top rim of the aquarium tank wall to which the bracket is attached, and is securely attached to the fish tank wall by means of plastic bolts screwed through holes in said vertical portion of the plastic bracket.

8. The combination of claim 6 wherein the vertical portion of the plastic bracket outside the fish tank extends below the top rim of the aquarium tank wall to which the bracket is attached and is securely attached to the fish tank wall by means of the mechanical strength existing between the vertical portion of the bracket outside the fish tank and the vertical portion of the bracket inside the fish tank.

9. The combination of claim 1 wherein the ends of the plastic bridge tube are flared.

10. The combination of claim 1 wherein the plastic brackets are formed by heating and repeated folding of a sheet of plastic to form the plastic brackets.

11. The combination of claim 1 wherein the plastic brackets are formed by extrusion of plastic through an extrusion die of the proper shape to form a bracket unit, followed by cutting out suitable holes.

12. The combination of claim 1 which comprises a second tube having a narrower diameter than said bridge tube, said second tube positioned to accommodate the insertion of the ends of the second tube in each of the fish tanks.

13. The combination of claim 1 wherein the plastic bridge tube is shaped by filling the tube with sand or gravel followed by heating the tube to soften the plastic and then bending the plastic tube to the desired shape.

14. The combination of claim 13 wherein the heated bridge tube is shaped to have two bends.

15. The combination of claim 13 wherein the heated plastic bridge tube is shaped to have four bends.

16. The combination of claim 1 wherein at least one of the ends of the plastic bridge tube has an endcap thereon and wherein the endcap has slots formed in the end surface of the cap of a size to control the separation of fish according to size.

17. The combination of two aquarium fish tanks bridged by a plastic bridge tube, said bridge tube being shaped to accommodate the insertion of the ends of said bridge tubes in each of the fish tanks, and a single pump connected to separate tubing of narrow diameter to promote a continuous dynamic flow of water and air from one of the tanks to the other tank and then back to the first tank through the plastic bridge tube to equalize the water level in both fish tanks, and to enhance the flow of fish through the plastic bridge tube.

18. The combination of claim 17 wherein the pump and also a filter are connected to said narrow diameter tube to force water and air in one of the tanks to flow to the other tank and then back to the first tank through the plastic bridge tube to equalize the water level in both fish tanks, to mechanically filter both tanks with only the one pump, and to enhance the flow of fish through the plastic bridge tube.

19. The combination of claim 18 wherein the pump and filter are submerged in the water in one of the fish tanks.

20. The combination of claim 18 wherein the pump and filter are situated external to the fish tanks and connected with the separate narrow diameter tubing.

21. The combination of claim 17 having two plastic brackets supporting said plastic bridge tube, one of each of the brackets coupled to the top of each fish tank, said plastic brackets being shaped with a vertical planar surface and a horizontal planar surface, each surface having a substantially semi-circular cut out in said planar surface of substantially the same diameter as the diameter of the fish tank bridge tube to provide stable support of the bridge tube both above and within the aquarium fish tanks being bridged.

22. The combination of claim 17 wherein at least one of the ends of the plastic bridge tube has an endcap thereon and wherein the endcap has slots formed in the end surface of the cap of a size to control the separation of fish according to size.

23. Means for enabling two aquarium fish tanks to be joined together so as to enable aquarium fish to swim back and forth between the aquarium tanks, said means comprising a plastic bridge tube and brackets therefor, said bridge tube being shaped to accommodate the insertion of the ends of said bridge tube in each of the fish tanks, and two plastic brackets for supporting said bridge tube and for being coupled to the top of each fish tank, said plastic brackets being shaped with a vertical planar surface and a horizontal planar surface, each surface having a substantially semi-circular cut out in said planar surface of substantially the same diameter as the diameter of the fish tank plastic bridge tube to provide stable support of said bridge tube both above and within the aquarium fish tanks being bridged.

24. Means for joining aquarium fish tanks together according to claim 23 wherein each of the plastic brackets are of serpentine shape with two vertical planar surfaces and a horizontal planar surface, wherein one of said vertical planar surfaces is pointing in the upward direction and the other vertical planar surface is pointing in the downward direction, wherein the upward pointing planar surface and the horizontal surface each have substantially semi-circular cut-outs in said planar surfaces.

* * * * *